No. 826,596. PATENTED JULY 24, 1906.
W. A. NEELY.
TRIMMING MECHANISM FOR SEWING MACHINES.
APPLICATION FILED JUNE 3, 1905.

5 SHEETS—SHEET 1.

WITNESSES:

INVENTOR
William A. Neely
BY
ATTORNEY

No. 826,596. PATENTED JULY 24, 1906.
W. A. NEELY.
TRIMMING MECHANISM FOR SEWING MACHINES.
APPLICATION FILED JUNE 3, 1905.

5 SHEETS—SHEET 3.

WITNESSES:

INVENTOR
William A. Neely
BY
ATTORNEY

No. 826,596. PATENTED JULY 24, 1906.
W. A. NEELY.
TRIMMING MECHANISM FOR SEWING MACHINES.
APPLICATION FILED JUNE 3, 1905.
5 SHEETS—SHEET 4.
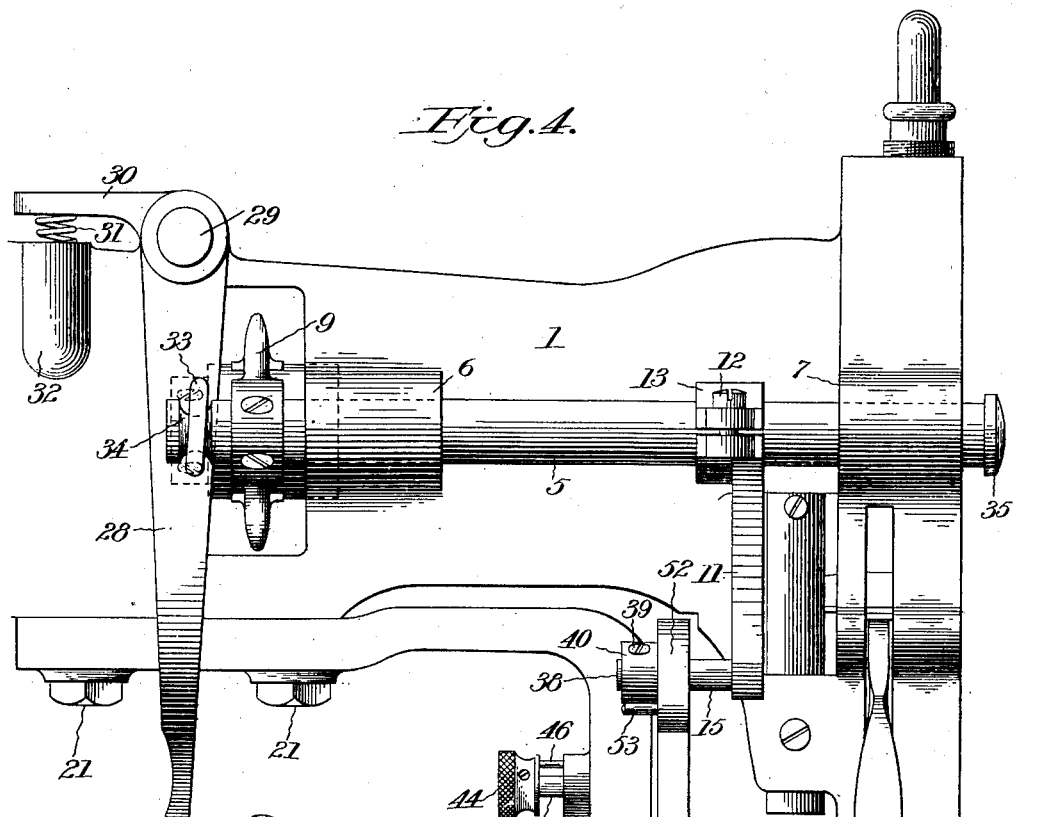
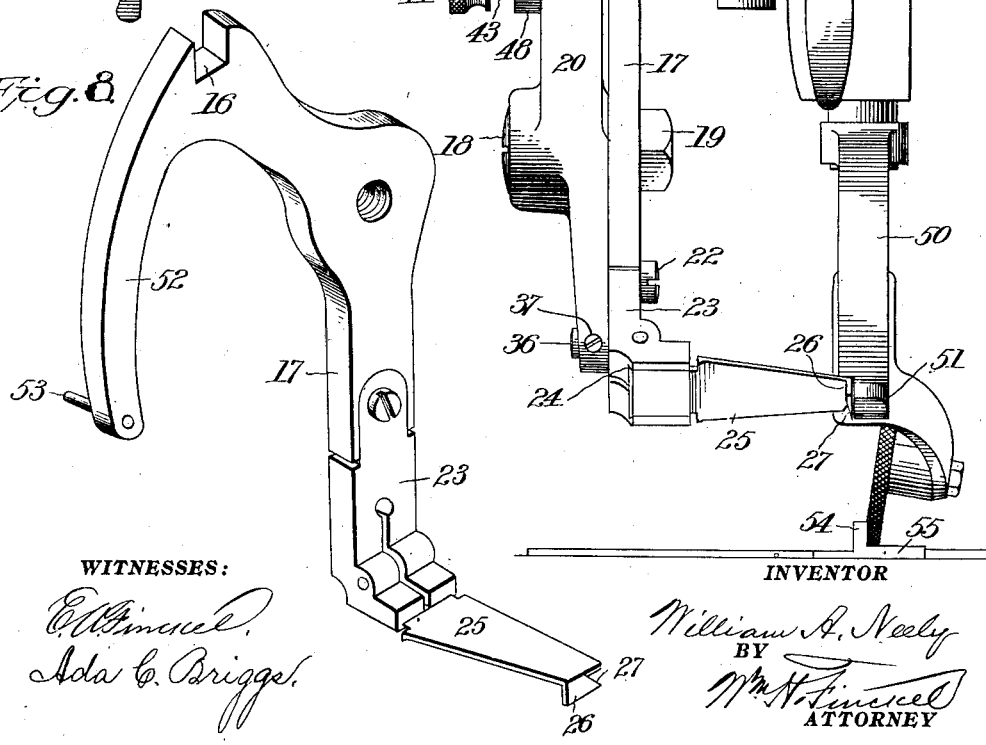
WITNESSES:
INVENTOR
William A. Neely
BY
ATTORNEY No. 826,596. PATENTED JULY 24, 1906.
W. A. NEELY.
TRIMMING MECHANISM FOR SEWING MACHINES.
APPLICATION FILED JUNE 3, 1905.

5 SHEETS—SHEET 5.

WITNESSES:

INVENTOR
William A. Neely
BY
ATTORNEY

UNITED STATES PATENT OFFICE.

WILLIAM A. NEELY, OF BOSTON, MASSACHUSETTS, ASSIGNOR TO WHEELER & WILSON MANUFACTURING COMPANY, OF BRIDGEPORT, CONNECTICUT, A CORPORATION OF CONNECTICUT.

TRIMMING MECHANISM FOR SEWING-MACHINES.

No. 826,596.　　　Specification of Letters Patent.　　　Patented July 24, 1906.

Application filed June 3, 1905. Serial No. 263,555.

*To all whom it may concern:*

Be it known that I, WILLIAM A. NEELY, a citizen of the United States, residing at Boston, in the county of Suffolk and State of Massachusetts, have invented a certain new and useful Improvement in Trimming Mechanisms for Sewing-Machines, of which the following is a full, clear, and exact description.

This invention relates to under-edge-trimming mechanisms for sewing-machines; and its object is to provide a mechanism which is reliable in its operation, simple of adjustment, and convenient of manipulation.

The invention consists of a trimmer-blade operated from the needle-actuating mechanism and oscillating in an arc of a vertically-arranged circle as distinguished from the commonly-employed devices actuated in an arc of a horizontally-arranged circle, all as will be hereinafter particularly set forth and finally claimed.

In the manufacture of leather goods, to which art the present invention is more particularly adapted, more or less difficulty has been experienced by the trimmed edge having the appearance of the use of a dull blade, and this undesirable finish is mainly due to the use of a blade the axis of oscillation of which is at right angles to the line of feed of the material, thus forming scallops on the trimmed edge of the material, and not only this, but the blade at the commencement of each cut must enter the goods, not by continuing the previously-made cut, but in a line tangent thereto, and it is this mode of operation which causes the undesirable finish. The present invention overcomes this difficulty by oscillating the blade on a horizontal axis and in an arc of a vertical circle, so that each succeeding cut is a continuation of and in line with the cut previously made.

Figure 1:
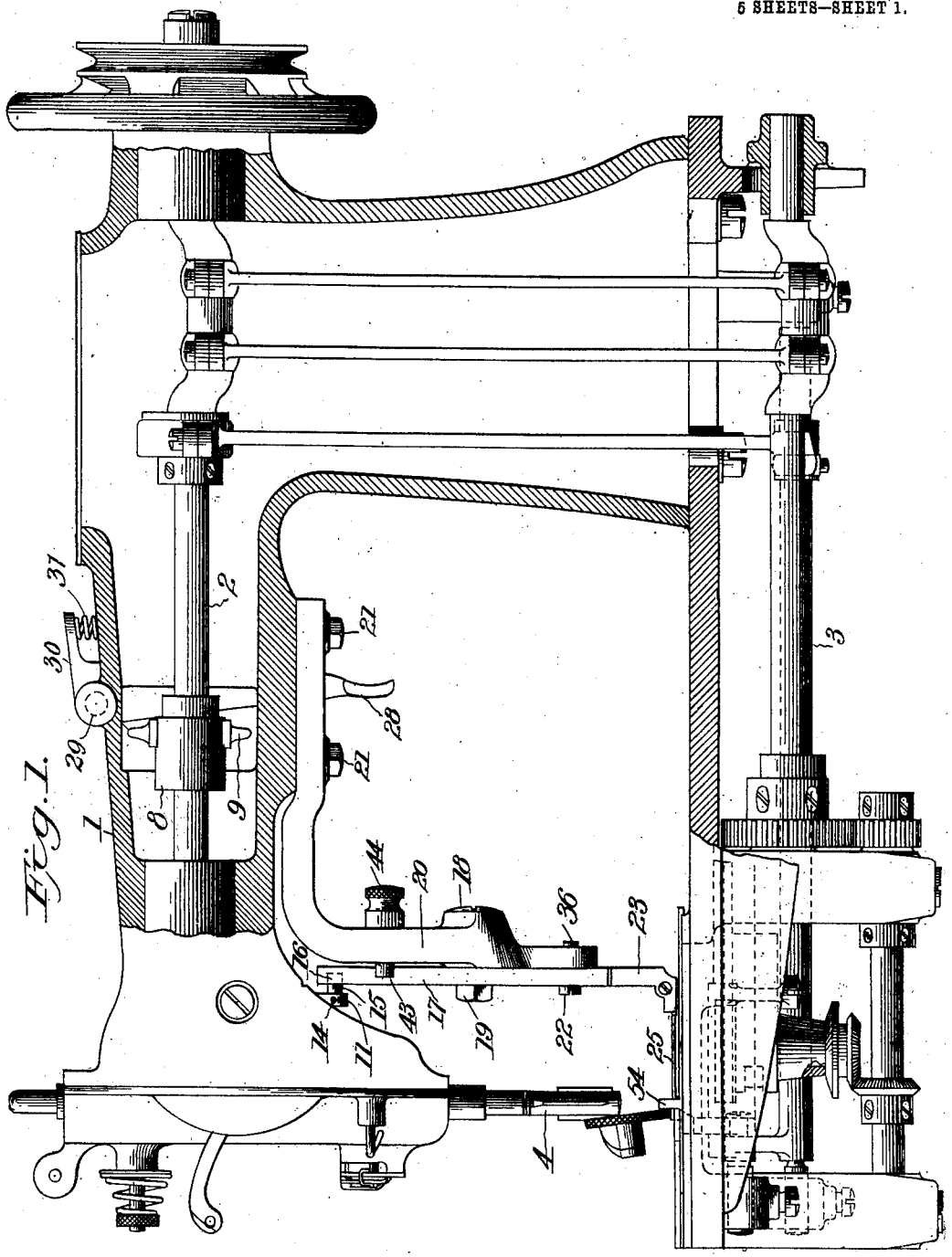
Figure 2:
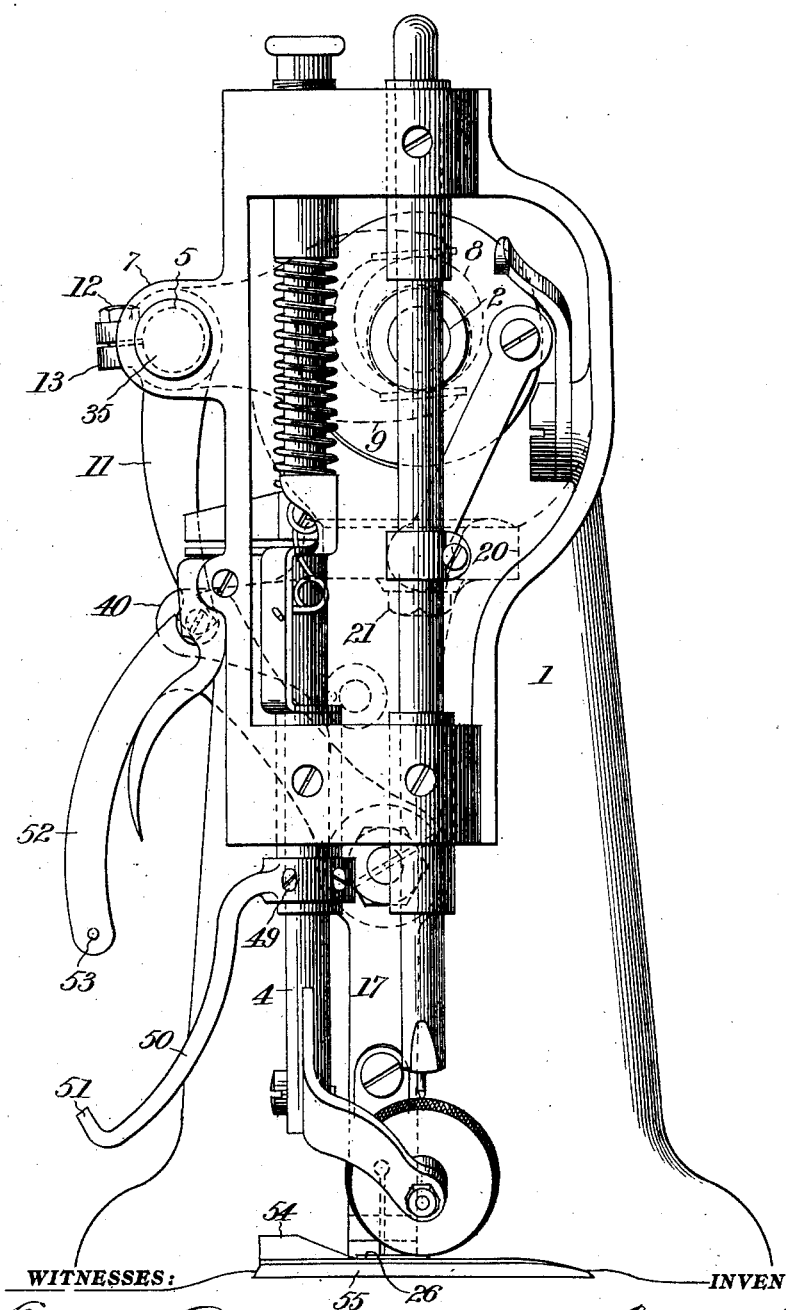
Figure 3:
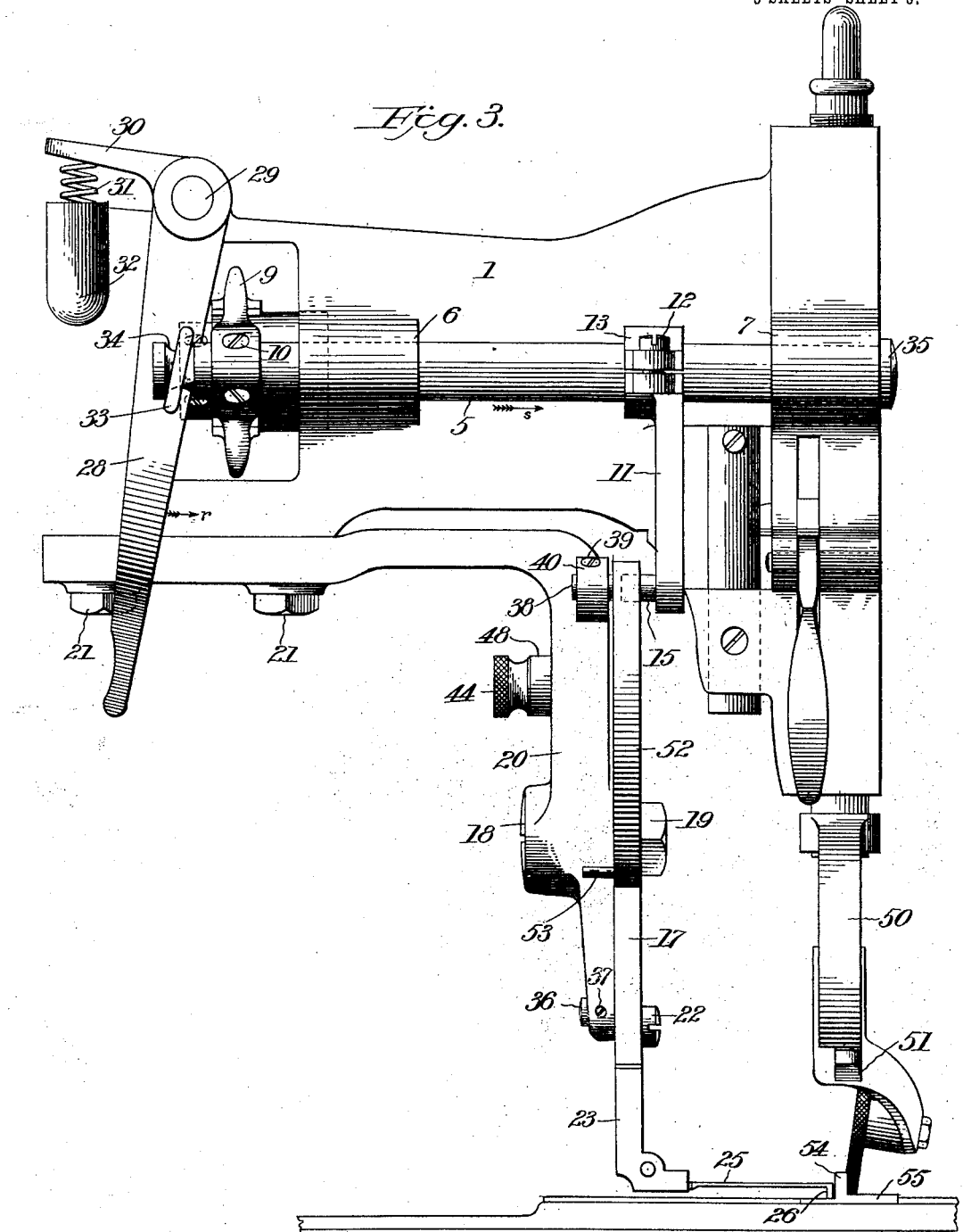
Figure 6:
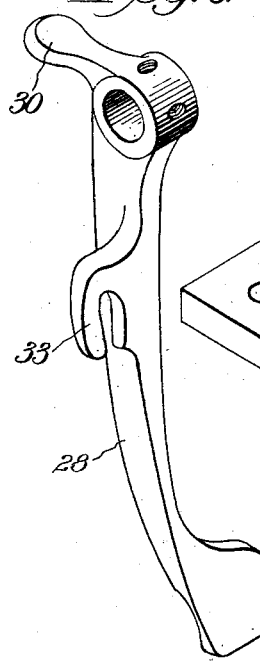
Figure 5:
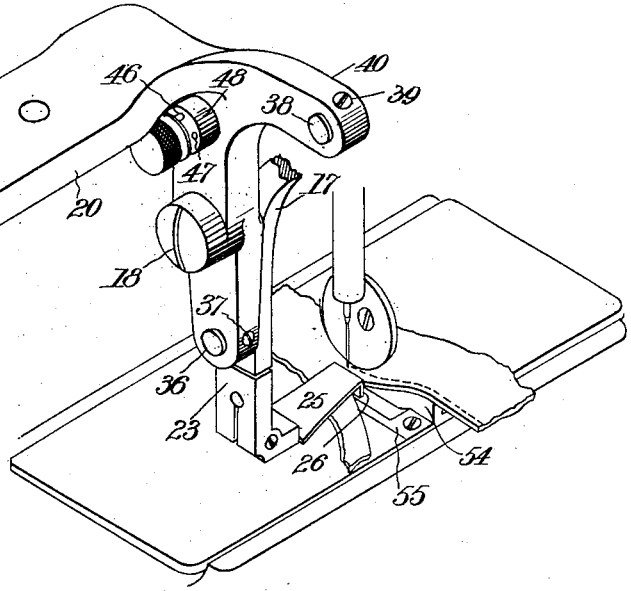
Figure 7:
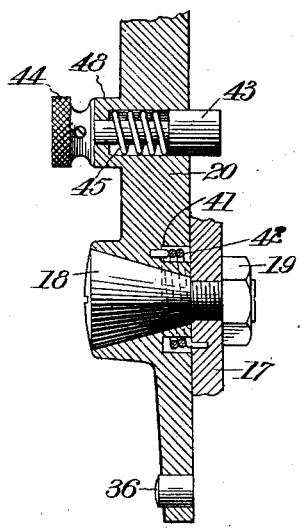

In the accompanying drawings, illustrating the invention, in the several figures of which like parts are similarly designated, Figure 1 is a front side elevation of a sewing-machine equipped with the invention, the overhanging arm and bed-plate being shown partly in section. Fig. 2 is a front end elevation with the face-plate removed. Fig. 3 is a rear side elevation of parts of the front end of the machine, showing the trimming mechanism in operative adjustment. Fig. 4 is a view similar to Fig. 3, the trimming mechanism being shown in one of its inoperative adjustments. Fig. 5 is a perspective view illustrating a trimmer-blade actuated to trim on an arc of a vertical circle. Fig. 6 is a perspective view of the hand-lever. Fig. 7 is a cross-section of a portion of the supporting-bracket of the trimmer-blade-actuating mechanism. Fig. 8 is a perspective view of the blade-carrying lever detached and blade.

The invention is shown as applied to the well-known Wheeler & Wilson vertical-hook machine having, among other usual parts, the overhanging arm 1, needle-actuating shaft 2, feed or main shaft 3, and presser-bar 4. The overhanging arm terminates at the left in a head in which are arranged the presser-bar and the needle-bar, with its needle, as usual.

5 is a rock-shaft mounted in suitable bearings 6 and 7, extending out from the overhanging arm.

8 is an eccentric secured to and rotating with the needle-bar-actuating shaft 2, which eccentric coacts with a forked lever 9, secured by screws 10 to the rock-shaft 5, thus transmitting rocking movements to said rock-shaft.

11 is a crank secured by a pinch-screw 12 and collar 13 to the rock-shaft, and to the lower end of this crank is secured by a screw 14, Fig. 1, a stud-bolt 15, the free end of which coacts with a notch 16, formed in the oscillating blade-carrying lever 17. This lever 17 is pivotally secured by a bolt 18 and nut 19 to a bracket 20, the latter secured by screws 21 to the under side of the overhanging arm at the side of the needle. To the lower end of the lever 17 is secured by a screw 22 a blade-holder 23, having a suitable recess 24, in which a trimmer-blade 25 is secured in any suitable way, as by a pinch-joint. The shank of the blade is arranged substantially horizontally, and its outer free end is provided with a downwardly-turned portion 26, the front edge 27 of which is sharpened to act upon one or more of the plies or thicknesses of work to trim the same close to the line of stitches. The bracket 20 depends from the under side of the overhanging arm at the rear of the needle, and the lever is pivoted to it in such manner that the trimmer-blade 25 projects forwardly substantially at a right angle to the line of feed and in such manner that the ply of material that is not to be cut may be laid over the top of the blade and the blade itself act only upon the under ply.

28 is a hand-lever secured on an oscillating shaft 29, mounted in a suitable bearing on the overhanging arm. This hand-lever has a toe 30, which is acted upon by a spring 31, seated in a suitable pocket 32 on the overhanging arm, said spring acting to hold the lever 28 against accidental movement in the direction indicated by the arrow r.

33 is a hook formed integral with the lever 28 and engaging a circumferential groove 34 in the end of the rock-shaft 5, so that when the lever 28 is moved in the direction indicated by the arrow r the hook 33 will bear against one wall of the groove and move the rock-shaft 5 in the direction indicated by the arrow s, and when the lever 28 is free to be moved by the spring 31 in the opposite direction the hook 33 bears against the opposite wall of the groove, causing the rock-shaft to be moved in a direction opposite to that indicated by the arrow s. The outer end of the rock-shaft 5 is constructed with a head 35, the inner face of which contacts with the face of the overhanging arm to limit the endwise movement of the rock-shaft 5 in the last-mentioned direction, the eccentric 8 being of sufficient length to permit of the required endwise movement of the rock-shaft without disconnecting the eccentric and the forked lever 9. A stud-bolt 36 is adjustably secured by a screw 37 in the lower end of the bracket 20, and a like stud-bolt 38 is adjustably secured by a screw 39 in an arm 40, made integral with the bracket 20, which stud-bolts when properly adjusted prevent the lever 17 from movements in directions transverse to its oscillation.

Located in a suitable seat 41, Fig. 7, formed in the bracket 20 and concentric with the stud-bolt 18, is a coiled spring 42, one end of which is secured to the bracket 20 and its other end connected with the lever 17, said spring set to hold the lever 17 when it is free to be moved in its inoperative position.

43 is a slide-bolt mounted in the bracket 20 and provided with a knurled head 44 and held in operative position (the position shown in Figs. 1 and 7) by a spring 45, the inner face of the head 44 being provided with a pin 46, Figs. 4 and 5, which when the bolt is in its normal position rests in a hole 47 in the boss 48, formed on the bracket 20, so that when the bolt is moved outward sufficiently to withdraw the pin 46 from the hole 47 the bolt 43 is free to be turned to cause the free end of the pin 46 to rest against the face of the boss 48, whereby the end of the bolt 43 is held in line with the adjacent face of the bracket 20.

To the presser-bar 4 is secured by screws 49 a bracket 50, the free end 51 of which acts as a guard to protect the trimmer-blade against accidental injury when adjusted to its inoperative position. (Illustrated in Fig. 4.) The oscillating blade-carrying lever 17 is provided with an arm 52, which at its free end is provided with a pin 53, which latter by contacting with the arm 40 (see Fig. 4) arrests the axial movement of the lever 17 when the latter is adjusted to its inoperative position. (Illustrated in Fig. 4.)

By adjusting the slide-bolt 43, as illustrated in Fig. 1, the inoperative adjustment of the trimming mechanism will place the blade in line with the guard 54, formed on the throat-plate 55, or intermediate the position illustrated by Fig. 4 and its operative position, and this latter adjustment is sufficient for general production; but if occasion requires it the blade may be adjusted to the position illustrated in Fig. 4 by adjusting the slide-bolt 43 so that its pin 46 rests upon the face of the boss 48, thus permitting the lever 17 to swing past the end of the bolt 43.

The operation of the device is as follows: Supposing the parts to occupy their operative positions, as illustrated in Figs. 1, 2, 3, and 5, the rotation of the eccentric 8 will cause, through the forked connection 9, the rock-shaft 5 to be oscillated and, through the connections 11, 15, 18, 19, 17, and 23, the trimmer-blade to be moved in an arc of a vertically-arranged circle, thus causing the cutting edge of the blade to sever the material in a line parallel to the line of the seam. When for any purpose it is desired to throw the blade out of operative position, the operator moves the lever 28 in the direction indicated by the arrow r, thus disconnecting the stud-bolt 15 from the lever 17 and permitting the spring 42 to move the lever 17 and its attached trimmer-blade into the inoperative position, (illustrated in Fig. 4,) the face of the free end of the stud-bolt 15 resting against the side of the arm 52, and when adjusted to this position the end 51 of the bracket 50 acts as a guard against accidental injury to the blade. When it is desired to readjust the blade to its operative position, as illustrated in Figs. 1, 2, 3, and 5, the operator swings the lever 17 toward its operative position until the stud-bolt 15 reëngages the lever 17. It will be observed that the horizontal portion of the blade 25 is above the material or work and that its cutting edge 26 27 stands vertically, and by this arrangement it is possible to cut some of the plies of many-ply work, while other plies which it is not desired to cut may be fed over the blade out of line with the cutting edge. Furthermore, it is possible to feed the entire work over the blade and sew it without throwing the blade out of position.

While a preferred trimmer-operating mechanism is herein shown and described, it is to be understood that other means may be used.

What I claim is—

1. In a trimming mechanism for sewing-machines, stitch-forming and cloth-feeding mechanisms, a trimmer-blade having a down-turned cutting edge at its free end to trim the stitched edge of an under ply between the seam and the outer edge of an overlapping ply, and connections between said trimmer-blade and the operating mechanism of the sewing-machine, including a blade-carrying lever oscillated in a vertical plane and from which the trimmer-blade projects horizontally and transversely to the line of feed.

2. In a trimming mechanism for sewing-machines, stitch-forming and cloth-feeding mechanisms, an oscillating lever mounted to oscillate in a vertical plane and provided with a trimmer-blade extending horizontally from said lever and arranged transversely to the line of feed and having its cutting edge projecting vertically downward to trim an under ply, said blade moving in an arc of a vertically-arranged circle, and connections between the oscillating blade-carrying lever and the actuating mechanism of the sewing-machine, including a rock-shaft, a cam carried by the needle-bar-actuating shaft, means to connect the rock-shaft and cam, means to connect the rock-shaft and lever to oscillate said lever and means to disconnect said rock-shaft and lever.

3. In a trimming mechanism for sewing-machines, stitch-forming and cloth-feeding mechanisms, a lever mounted to oscillate in a vertical plane and provided with a trimmer-blade arranged to trim in an arc of a vertically-arranged circle, a rock-shaft capable of axial and longitudinal movements, and means to actuate said rock-shaft, in combination with a lever for moving the rock-shaft longitudinally out of connection with the blade-carrying lever and thereby arrest the movement of said blade-carrying lever.

4. In a trimming mechanism for sewing-machines, a stitch-forming mechanism including a needle, a cloth-feeding mechanism, a trimmer-blade, a vertically-arranged lever from which said blade projects horizontally toward the needle and transversely to the line of feed, a fixed bracket having a horizontally-arranged pivot for said lever, a rock-shaft, and means to connect and disconnect the rock-shaft and lever.

5. In a trimming mechanism for sewing-machines, a trimmer-blade projecting horizontally toward the needle and at right angles to the feed and having a vertically-arranged cutting edge beneath it, a vertically-arranged lever carrying said blade, a fixed bracket arranged at the side of the needle and having a horizontally-arranged pivot for said lever, a rock-shaft, and means to connect and disconnect the rock-shaft and lever, combined with a cloth-feeding mechanism, a needle, a needle-actuating shaft, an eccentric on said shaft, and connections between the eccentric and rock-shaft for rocking the lever.

6. In an under-edge-trimming mechanism for sewing-machines, a stitch-forming mechanism including a needle, a cloth-feeding mechanism, a vertically-arranged lever, a fixed bracket arranged alongside of the needle and having a horizontal pivot on which the lever is mounted whereby said lever may be oscillated in a plane parallel to the line of feed, a trimmer-blade secured to the lower end of said lever and projecting horizontally therefrom and transversely to the line of feed and formed to trim the stitched edge of an under ply between the seam and the outer edge of an overlapping ply, and means to oscillate said lever.

7. In a trimming mechanism for sewing-machines, stitch-forming and cloth-feeding mechanisms, a trimmer-blade having a down-turned cutting edge at its free end to trim the stitched edge of an under ply between the seam and the outer edge of an overlapping ply, connections between said trimmer-blade and the operating mechanism of the sewing-machine, including a blade-carrying lever oscillated in a vertical plane and from which the trimmer-blade projects horizontally and transversely to the line of feed, disconnecting means for rendering said lever inoperative, and means for holding the lever in its inoperative position.

8. In an under-edge-trimming mechanism for sewing-machines, a stitch-forming mechanism including a needle, a cloth-feeding mechanism, a vertically-arranged lever, a fixed bracket arranged alongside of the needle and having a horizontal pivot on which the lever is mounted, whereby said lever may be oscillated in a plane parallel to the line of feed, a trimmer-blade secured to the lower end of said lever and projecting horizontally therefrom and transversely to the line of feed and formed to trim the stitched edge of an under ply between the seam and the outer edge of an overlapping ply, means to oscillate said lever, a spring interposed between the lever and its bracket to hold the lever in inoperative position, means to restrain the action of the spring and disconnecting means for rendering said lever inoperative and the spring operative.

9. In a trimming mechanism for sewing-machines, stitch-forming and cloth-feeding mechanisms, a trimmer-blade having a down-turned cutting edge at its free end to trim the stitched edge of an under ply between the seam and the outer edge of an overlapping ply, connections between said trimmer-blade and the operating mechanism of the sewing-machine, including a blade-carrying lever oscillated in a vertical plane and from which the trimmer-blade projects horizontally and transversely to the line of feed, disconnecting means for rendering said lever inoperative and a guard arranged beyond the path of movement of the blade when in action and in position alongside of the blade when the said blade is rendered inoperative.

In testimony whereof I have hereunto set my hand this 1st day of June, A. D. 1905.

WILLIAM A. NEELY.

Witnesses:
F. W. OSTROM,
A. DONIHEE.